United States Patent Office 3,287,351
Patented Nov. 22, 1966

3,287,351
ORGANIC NUCLEOTIDE DERIVATIVES AND
METHOD OF MANUFACTURING THE SAME
Louis Cantineau, Blois, and Georges Bernet, Paris,
France, assignors to Société Civile de Recherches
Scientifiques et Industrielles "Sodersi," Paris, France, a
company of France
No Drawing. Filed Nov. 22, 1963, Ser. No. 325,747
Claims priority, application France, Nov. 23, 1962,
916,372, 916,373
1 Claim. (Cl. 260—211.5)

This invention relates to new organic derivatives having useful pharmacological properties, and more particularly to organic derivatives of the ribonucleic acids.

It is already known to prepare metallic salts from deoxyribonucleic acids, particularly from the deoxyribonucleates of magnesium, manganese, sodium and calcium, which are commonly used in pharmacy. On the other hand, as far as is known, there has hitherto been no preparation and isolation of chemical compounds derived from ribonucleic acids and from complex substances possessing a natural phamacodynamic activity.

This invention has for its object chemical compounds of which the molecule contains at least one radical deriving from a nucleotide of the group comprising the zymonucleic, thymonucleic and other ribonucleic acids together with their salts, compounds and derivatives, which radical is associated to at least one radical deriving from an organic substance of the group comprising pyridoxine, pyridoxal, pyridoxamine, thiamine and other pyridine bases, cobalamines, particularly hydroxocobalamine and other vitamins, urethane, 1,4-dimethanesulfonoxybutane, the bis-β-chloroethylamines, the ethyleneimines, the ethylene-amides and other alkylating compounds, 6-mercaptopurine, 8-azaguanine and other purine bases, azathymine and other pyrimidine bases, cystine, azaserine, betaine and other aminated acids, aminopterine, A-methopterine and other antifolics, choline and other aminated alcohols, colchicine and other alkaloids, tetracycline, oxytetracycline, framycetin, erythromycin, polymyxin, streptomycin, neomycin, the esters of benzylpenicillin and other antibiotics, oestradiol, testosterone, androstenediol, desoxycorticosterone, aldosterone, cortisone, hydrocortisone, pregnenolone, norandrostenolone and other hormones, and the salts, compounds and derivatives thereof.

The invention relates most notably to the deoxyribonucleates of pyridoxine and hydroxocobalamine.

It also has for its object a method of manufacturing the aforementioned compounds, which consist in causing a derivative of ribonucleic acid to react with a salifiable organic substance from the group comprising pyridoxine, pyridoxal, pyridoxamine, thiamine and other pyridine bases, cobalamines, particularly hydroxocobalamine and other vitamins, urethane, 1,4-dimethanesulfonoxybutane, the bis-β-chloroethylamines, the ethylene-imines, the ethylene amides and other alkylating compounds, 6-mercaptopurine, 8-azaguanine and other purine bases, azathymine and other pyrimidine bases, cystine, azaserine, betaine and other aminated acids, aminopterine, A-methopterine and other antifolics, choline and other aminated alcohols, colchicine and other alkaloids, tetracycline, oxytetracycline, framycetin, erythromycin, polymyxin, streptomycin, neomycin, the esters of benzylpenicillin and other antibiotics, oestradiol, testosterone, androstenediol, desoxycorticosterone, aldosterone, cortisone, hydrocortisone, pregnenolone, norandrostenolone and other hormones, and the salts, compounds and derivatives thereof.

The derivative of ribonucleic acid can be part of the group comprising the tetranucleotides of adenine, guanine, uracil and other purine bases, thymine, cytosine and other pyridine bases, together with their polymers, more specifically the deoxyribonucleic acids, and the salts, derivatives and salifiable compounds thereof.

The invention also has for its object new drugs of specific therapeutic activity and having a preferably localized action, characterized in that they contain at least one derivative of a nucleotide and of a medicinal substance having said specific activity.

The said medicinal substance can be part of the group comprising pyridoxine, pyridoxal, pyridoxamine, thiamine and other pyridine bases, cobalamines, hydroxocobalamine and other vitamins, urethane, 1,4-dimethanesulfonoxybutane, the bis-β-chloroethylamines, the ethyleneimines, the ethylene-amides and other alkylating compounds, 6-mercaptopurine, 8-azaguanine and other purine bases, azathymine and other pyrimidine bases, cystine, azaserine, betaine and other aminated acids, aminopterine, A-methopterine and other antifolics, choline and other aminated alcohols, colchicine and other alkaloids, tetracycline, oxytetracycline, framycetin, erythromycin, polymyxin, streptomycin, neomycin, the esters of benzylpenicillin and other antibiotics, oestradiol, testosterone, androstenediol, desoxycorticosterone, aldosterone, cortisone, hydrocortisone, pregnenolone, norandrostenolone and other hormones, and the salts, compounds and derivatives thereof.

The nucleotide can be part of the group comprising the zymonucleic, thymonucleic and other ribonucleic acids, together with the salts, compounds and derivatives thereof.

The nucleotide can with advantage be a deoxyribonucleic acid normally present in the organ specifically sensitive to the medicinal substance associated to the nucleotide radical in the drug according to the present invention.

Indeed, it is well-known that the deoxyribonucleic acids are excellent stimulants for cell metabolism and that once introduced into a living being's system they will preferably fix themselves on the cells enclosing the same type of deoxyribonucleic acid. The association of an active medicinal substance to a deoxyribonucleic acid that characterizes the drugs according to this invention provides far more effective therapeutic possibilities than when the same substance is manufactured alone in the conventional way. The deoxyribonucleic radical contained in the molecule of the drug according to this invention conveys the medicinal radical into the cells having an affinity for this deoxyribonucleic acid, thereby enabling an elective specific treatment to be carried out. The drug is thus conveyed selectively into the effective organ and the therapeutic results obtained are a distinct improvement on those obtained with conventional treatments, for a given medicinal dose.

In addition, the drugs according to this invention permit the use, in therapeutics, of medicinal substances whose utilization was heretofore envisaged only with the greatest circumspection because of the sudden toxic effect they are liable to have on cells other than those to be treated.

The posology of the drugs according to the invention, as well as the therapeutic indications therefor, are as stipulated for the medicinal substances contained in the drugs, when associated to a nucleotide.

This invention relates most notably to drugs for treating vitamin deficiencies and skin, neutrological and heart disorders, that contain at least one derivative of the group comprising the deoxyribonucleates of pyridoxine, pyridoxal, pyridoxamine and hydroxocobalamine; the new lipotrope drugs containing at least one derivative of the group comprising the deoxyribonucleates of choline and betaine; the new antimetabolic drugs containing at least one derivative from the group comprising the deoxyribonucleates of 6-mercaptopurine, 8-azaguanine, azathymine, crystine, azaserine, aminopterine, and A-methopterine; and the new cytotoxic drugs containing at least one derivative from the group comprising the deoxyribonucleates of urethane, 1,4-dimethanesulfonoxybutane, methylbis - β - chloroethylamine, β - nathtylbischloroethylamine, oxyribonucleate with an efficiency that is for all practical purposes quantitative.

The characteristic properties of pyridoxine deoxyribonucleate, as compared with those of deoxyribonucleic acid, pyridoxine hydrochloride and base-pyridoxine, are as follows:

|  | Deoxyribonucleic acid | Pyridoxine | | Pyridoxine Deoxyribonucleate |
|---|---|---|---|---|
|  |  | Hydrochloride | Base |  |
| Solubility in water | Barely soluble | Very soluble | Soluble | Soluble. |
| Alcohol | Insoluble | Soluble | do | Insoluble. |
| Melting point | Decomposition | 206–208 | 154 | Decomposition. |
| UV Spectrum at pH 7 | Max. 2,100–2,600 Min. 2,350 | Max. 2,200 2,500 3,200 | Max. 2,200 2,500 3,275 | Max. 2,100. 2,600. 3,200. | triethylenemelamine, triethylenephosphoramide, thiotriethylenephosphoramide, N-methyldesacetyl-colchicine, n-desacetylthiocolchicine.

The invention also has for its object the new hemopoeitic drugs, which are protide assimilation factors, growth factors, anti-anemic, and stimulants of the metabolism of the medullary cells, and consist at least in part of deoxyribonucleates of hydroxocobalamine.

The invention further relates to anti-infection drugs consisting at least in part of a derivative from the group comprising the deoxyribonucleates of tetracycline, oxytetracycline, framycetin, erythromycin, polymyxin, streptomycin, neomycin, and the esters of benzylpenicillin.

The invention further has for its object drugs for treating hormone disorders, consisting at least in part of a derivative from the group comprising the deoxyribonucleates of oestradiol, testosterone, androstenediol, desoxycorticosterone, aldosterone, cortisone, hydrocortisone, pregnenolone, norandrostenolone.

The invention will be clearly understood from the description which follows of numerous examples of carrying the invention into effect.

The chemical compounds forming the object of this invention can be prepared by salifying a free ribonucleic acid with a body having a free OH function or by a double decomposition between an alkaline ribonucleate and a body possessing a salifiable OH function.

In the examples given hereinbelow, the deoxyribonucleic acid is a commercial type tetranucleotide adenine-guanine-thymine-cytosine having an average molecular weight of 1253 and sold by Schwarz Bioresearch, Inc., U.S.A. Use could be made of polymers of this tetranucleotide, or of other tetranucleotides and their polymers containing other aminated bases. Depending on the application envisaged for a compound according to this invention, recourse can be had to deoxyribonucleic acids originating from determinate species and from specific organs.

*Example I*

*Preparation of pyridoxine deoxyribonucleate.*—Into 200 cc. of distilled water are poured 8.255 grams of pyridoxine hydrochloride (0.04 mole). The liquid is agitated until dissolution, after which 12.53 g. of deoxyribonucleic acid (0.01 mole) are added. After further shaking to maintain the state of suspension, 40 cc. of normal alcohol potash (0.04 mole) are added drop by drop until complete dissolution of the deoxyribonucleic acid. The solution is then strained and evaporated at 80° C. until it has been reduced to ⅕ of its original volume. Precipitation is obtained with alcohol, after which the precipitate is washed with alcohol before being dried and pulverized. This makes it possible to obtain very pure pyridoxine de-

*Example II*

The base-pyridoxine is first prepared by passing a solution of pyridoxine hydrochloride over an ion exchanging anionic resin such as that sold under the trade name of Lewatit MP–60. In 200 cc. of water are dissolved 8.255 g. of pyridoxine hydrochloride (0.04 mole), and this solution is passed over a column containing 30 g. of Lewatit MP–60 that has first been activated by washing with a 4% sodium solution. The hydrochloride solution is recycled until all traces of chlorine have been eliminated. The base-pyridoxine solution formed thus is then poured into a suspension of 12.53 g. of dioxyribonucleic acid (0.01 mole) in 100 cc. of water. After dissolution of the acid, the solution is filtered, reduced to ⅕ of its volume by evaporation at 80° C., precipitated with alcohol, then washed with alcohol, after which the precipitate is pulverized as in Example I hereinbefore.

The pyridoxine deoxyribonucleate obtained in this manner is identical to that of Example I.

*Example III*

*Preparation of hydroxocobalamine deoxyribonucleate.*—53.85 g. of hydroxocobalamine (0.04 mole) are dissolved in 2000 cc. of distilled water, and this solution is poured slowly into a suspension of 12.53 g. of deoxyribonucleic acid (0.01 mole) in 1000 cc. of water, while stirring at the same time. After dissolution of the acid, the solution obtained is filtered and reduced to ⅕ of its initial volume by evaporation at 80° C. Precipitation is obtained by adding acetone, following which filtering is effected and the precipitate washed with acetone, then dried and pulverized. This enables hydroxocobalamine deoxyribonucleate to be obtained with a virtually quantitative efficiency.

It is possible to proceed in similar fashion, in accordance with classic chemistry rules, to obtain compounds other than those of the examples cited precedingly, more particularly with pyridoxal, pyridoxamine, thiamine, choline, betaine, urethane, or the "nitrogen mustards," the antibiotic bases and the basic hormones, when it is desired to obtain compounds of deoxyribonucleic acids according to this invention.

It will of course be manifest to the specialist in the art that many modifications can be made to the methods and examples hereinbefore described, without departing from the spirit and scope of the invention. By way of example, the new subject drugs of this invention can be associated within a same pharmaceutic preparation to other substances, medicinal or otherwise, whereby to achieve a combined therapeutic effect or permit easier or more pleasant administering of the drug.

What we claim is:

A composition of matter composed at least in part of at least one deoxyribonucleate selected from a group consisting of pyridoxine, pyridoxal, pyridoxamine, hydroxocobalamine, choline, betaine, urethane, 1,4 - dimethanesulfonoxylbutane, methyl - bis - β - chloroethylamine, β-naphthyl - bis - chloroethylamine, triethylenemelamine, triethylenephosphoramide, thiotriethylenephosphoramide, N - methyldesacetyl - colchicine, N - desacetylthiocolchicine, hydroxocobalamine, tetracycline, oxytetracyline, framycetin, erythromycin, polymyxin, streptomycin, neomycin, benzylpenicillin ester, oestradiol, testosterone, androstenediol, desoxycorticosterone, aldesterone, cortisone, hydrocortisone, pregnenolone, and norandrostenolone deoxyribonucleates.

References Cited by the Examiner

UNITED STATES PATENTS

| | | | |
|---|---|---|---|
| 2,830,985 | 4/1958 | Baker et al. | 260—211.5 |
| 2,844,514 | 7/1958 | Morell et al. | 260—211.5 |
| 3,104,171 | 9/1963 | Sakaguchi et al. | 260—211.5 |
| 3,116,282 | 12/1963 | Hunter | 260—211.5 |
| 3,120,511 | 2/1964 | Tanaka et al. | 260—211.5 |

LEWIS GOTTS, *Primary Examiner.*

JOHNNIE R. BROWN, *Assistant Examiner.*